United States Patent
Shah et al.

(10) Patent No.: US 7,541,705 B2
(45) Date of Patent: Jun. 2, 2009

(54) FAULT-TOLERANT PERMANENT MAGNET MACHINE WITH RECONFIGURABLE FLUX PATHS IN STATOR BACK IRON

(75) Inventors: Manoj Ramprasad Shah, Latham, NY (US); John Michael Kern, Rexford, NY (US); Ayman Mohamed Fawzi el-Rafaie, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 92 days.

(21) Appl. No.: 11/729,512

(22) Filed: Mar. 28, 2007

(65) Prior Publication Data
US 2008/0238217 A1    Oct. 2, 2008

(51) Int. Cl.
H02K 11/00 (2006.01)
(52) U.S. Cl. ..................... 310/68 C; 310/254
(58) Field of Classification Search ............ 310/68 C, 310/209, 190–191, 216, 67 R, 254; 322/37, 322/46
See application file for complete search history.

(56) References Cited

U.S. PATENT DOCUMENTS

| | | | | |
|---|---|---|---|---|
| 4,025,840 A | 5/1977 | Brissey et al. | ................. | 322/52 |
| 4,305,031 A | 12/1981 | Wharton | ..................... | 322/29 |
| 4,476,395 A | 10/1984 | Cronin | .......................... | 290/6 |
| 4,641,080 A | 2/1987 | Glennon et al. | ............... | 322/49 |
| 4,691,119 A | 9/1987 | McCabria | .................... | 307/84 |
| 4,734,606 A * | 3/1988 | Hajec | ....................... | 310/90.5 |
| 4,766,362 A | 8/1988 | Sadvary | ........................ | 322/50 |
| 4,950,973 A | 8/1990 | Kouba | .......................... | 322/69 |
| 5,196,745 A * | 3/1993 | Trumper | ..................... | 310/12 |
| 5,245,238 A * | 9/1993 | Lynch et al. | ................. | 310/116 |
| 5,300,848 A | 4/1994 | Huss et al. | .................... | 310/83 |
| 5,397,975 A | 3/1995 | Syverson | ..................... | 322/46 |
| 5,530,307 A | 6/1996 | Horst | .................... | 310/156.49 |
| 5,684,352 A | 11/1997 | Mita et al. | ............. | 310/156.56 |

(Continued)

FOREIGN PATENT DOCUMENTS

JP    55061265    5/1980

(Continued)

OTHER PUBLICATIONS

Favorable Slot and Pole Number Combinations for Fault-Tolerant PM Machines, A. Mitcham, G. Antonopoulos, J. Cullen, IEE Proceedings (vol. 151, No. 5, Sep. 30, 2003, Revised Apr. 2, 2004).

*Primary Examiner*—Michael C Zarroli
(74) *Attorney, Agent, or Firm*—Penny A. Clarke

(57) ABSTRACT

A permanent magnet (PM) machine has a fault condition mechanism disposed within a back iron of the stator portion, the mechanism operational to automatically reduce fault currents associated with the PM machine during a fault condition. The fault condition mechanism disposed within the stator back iron is reconfigurable to automatically reduce internal heat associated with the PM machine during a fault condition. A method of reconfiguring the PM machine upon detecting a fault condition includes the steps of 1) selecting the reconfigurable fault condition mechanism from a) a plurality of magnetically anisotropic rotatable cylinders, b) a plurality of ferrofluid-filled cavities, and c) a dual-phase material selectively embedded within the stator core; and 2) reconfiguring the fault condition mechanism to automatically reduce fault currents or internal heat associated with the PM machine upon detection of a fault condition.

22 Claims, 5 Drawing Sheets

U.S. PATENT DOCUMENTS

| | | | |
|---|---|---|---|
| 5,821,710 A | 10/1998 | Masazawa et al. | 318/254 |
| 5,841,212 A | 11/1998 | Mita et al. | 310/156.56 |
| 5,929,549 A | 7/1999 | Trago et al. | 310/198 |
| 5,955,809 A | 9/1999 | Shah | 310/112 |
| 6,037,752 A | 3/2000 | Glennon | 322/22 |
| 6,255,005 B1 | 7/2001 | Yokoyama et al. | 428/683 |
| 6,313,560 B1 | 11/2001 | Dooley | 310/259 |
| 6,455,975 B1 | 9/2002 | Raad et al. | 310/209 |
| 6,531,799 B1 | 3/2003 | Miller | 310/114 |
| 6,555,941 B1 | 4/2003 | Zepp et al. | 310/191 |
| 6,750,628 B2 | 6/2004 | Franco et al. | 318/727 |
| 6,800,977 B1 | 10/2004 | Ostovic | 310/156.38 |
| 6,838,779 B1 | 1/2005 | Kandil et al. | 290/31 |
| 6,847,224 B2 * | 1/2005 | Lee et al. | 324/772 |
| 6,849,983 B2 | 2/2005 | Tajima et al. | 310/166 |
| 6,873,236 B2 * | 3/2005 | Shah et al. | 336/58 |
| 6,936,948 B2 * | 8/2005 | Bell et al. | 310/201 |
| 6,949,908 B2 | 9/2005 | Maslov et al. | 318/727 |
| 6,989,641 B2 | 1/2006 | Schulz et al. | 318/139 |
| 7,042,128 B2 | 5/2006 | Zepp et al. | 310/191 |
| 7,064,526 B2 | 6/2006 | Patterson | 322/46 |
| 2002/0084705 A1 | 7/2002 | Kawamura | 310/68 R |
| 2003/0042814 A1 | 3/2003 | Tagome et al. | 310/156.08 |
| 2003/0102758 A1 | 6/2003 | Kusase et al. | 310/156.66 |
| 2004/0184204 A1 | 9/2004 | Dooley | 361/23 |
| 2004/0189108 A1 | 9/2004 | Dooley | 310/52 |
| 2004/0239202 A1 | 12/2004 | Dooley | 310/184 |
| 2004/0245869 A1 | 12/2004 | Dooley | 310/68 C |
| 2004/0251765 A1 | 12/2004 | Dooley et al. | 310/214 |
| 2005/0212374 A1 | 9/2005 | Mitcham | 310/216 |
| 2005/0225271 A1 | 10/2005 | Anwar et al. | 318/254 |
| 2006/0087776 A1 | 4/2006 | Cullen et al. | 361/23 |
| 2006/0119206 A1 | 6/2006 | Akemakou | 310/181 |

FOREIGN PATENT DOCUMENTS

| | | |
|---|---|---|
| JP | 2000236649 | 8/2000 |
| JP | 2002171734 | 6/2002 |
| JP | 2004064807 | 2/2004 |
| JP | 2004328944 | 11/2004 |
| JP | 2005073444 | 3/2005 |
| JP | 2005261008 | 9/2005 |
| WO | WO87/07785 | 12/1987 |
| WO | WO94/14226 | 6/1994 |

* cited by examiner

ENGAGED POSITION

DISENGAGED POSITION

FAULT-TOLERANT PERMANENT MAGNET MACHINE WITH RECONFIGURABLE FLUX PATHS IN STATOR BACK IRON

BACKGROUND

The present invention is directed to permanent magnet machines, and more particularly to a method of making a permanent magnet machine more fault-tolerant.

Many new aircraft systems are designed to accommodate electrical loads that are greater than those on current aircraft systems. The electrical system specifications of commercial airliner designs currently being developed may demand up to twice the electrical power of current commercial airliners. This increased electrical power demand must be derived from mechanical power extracted from the engines that power the aircraft. When operating an aircraft engine at relatively low power levels, e.g., while idly descending from altitude, extracting this additional electrical power from the engine mechanical power may reduce the ability to operate the engine properly.

Traditionally, electrical power is extracted from the high-pressure (HP) engine spool in a gas turbine engine. The relatively high operating speed of the HP engine spool makes it an ideal source of mechanical power to drive the electrical generators connected to the engine. However, it is desirable to draw power from additional sources within the engine, rather than rely solely on the HP engine spool to drive the electrical generators. The low-pressure (LP) engine spool provides an alternate source of power transfer.

PM machines (or generators) are a possible means for extracting electric power from the LP spool. However, aviation applications require fault tolerance, and as discussed below, PM machines can experience faults under certain circumstances and existing techniques for fault tolerant PM generators suffer from drawbacks, such as increased size and weight.

Permanent magnet (PM) machines have high power and torque density. Using PM machines in applications wherein minimizing the weight is a critical factor is therefore advantageous. These applications are wide ranging and include aerospace applications.

One of the key concerns with using PM machines is fault-tolerance since the magnets cannot be "turned off" in case of a fault. Traditionally, the use of PM machines has been avoided in applications where fault-tolerance is a key factor. When PM machines have been used in such applications, fault-tolerance has been achieved by paying a penalty in the form of oversized machines and/or converter designs, or using a higher number of phases which complicates the control process and adds to the overall system weight and cost.

As is known to those skilled in the art, electrical generators may utilize permanent magnets (PM) as a primary mechanism to generate magnetic fields of high magnitudes. Such machines, also termed PM machines, are formed from other electrical and mechanical components, such as wiring or windings, shafts, bearings and so forth, enabling the conversion of electrical energy from mechanical energy, where in the case of electrical motors the converse is true. Unlike electromagnets which can be controlled, e.g., turned on and off, by electrical energy, PMs always remain on, that is, magnetic fields produced by the PM persists due to their inherent ferromagnetic properties. Consequently, should an electrical device having a PM experience a fault, it may not be possible to expediently stop the device because of the persistent magnetic field of the PM causing the device to keep operating. Such faults may be in the form of fault currents produced due to defects in the stator windings or mechanical faults arising from defective or worn-out mechanical components disposed within the device. Hence, the inability to control the PM during the above mentioned or other related faults may damage the PM machine and/or devices coupled thereto.

Further, fault-tolerant systems currently used in PM machines substantially increase the size and weight of these devices limiting the scope of applications in which such PM machines can be employed. Moreover, such fault tolerant systems require cumbersome designs of complicated control systems, substantially increasing the cost of the PM machine.

In view of the foregoing, it would be advantageous and beneficial to provide a method for limiting winding currents for all types of faults, especially a turn-to-turn fault associated with a PM machine to significantly improve the fault-tolerance capability of the PM machine without substantially increasing the size, weight and/or complexity of the PM machine.

BRIEF DESCRIPTION OF THE INVENTION

The present invention is directed to a permanent magnet (PM) machine having a fault condition mechanism disposed within a back iron of the stator portion, the mechanism operational to automatically reduce fault currents associated with the PM machine during a fault condition.

The fault condition mechanism disposed within the stator back iron is reconfigurable to automatically reduce internal heat associated with the PM machine during a fault condition.

A method of reconfiguring the PM machine upon detecting a fault condition includes the steps of 1) selecting the reconfigurable fault condition mechanism from a) a plurality of magnetically anisotropic rotatable cylinders, b) a plurality of ferrofluid-filled cavities, and c) a dual-phase material selectively embedded within the stator core; and 2) reconfiguring the fault condition mechanism to automatically reduce fault currents or internal heat associated with the PM machine upon detection of a fault condition.

BRIEF DESCRIPTION OF THE DRAWINGS

Other aspects and features of the present invention and many of the attendant advantages of the present invention will be readily appreciated as the same become better understood by reference to the following detailed description when considered in connection with the accompanying drawings in which like reference numerals designate like parts throughout the figures thereof and wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Conventional PM synchronous electric machines employ permanent magnets as the magnetic poles of a rotor, around which a stator is disposed. The stator has a plurality of teeth that face the rotor. Alternatively, the machine may be designed so that the rotor surrounds the stator. For high-speed operation, a retaining sleeve is usually wrapped around the magnets as needed to keep the magnets in place. The retaining sleeve may be shrink fit upon the magnets to ensure a non-slip fit. Usually the retaining sleeve is made of one whole metallic piece for structural integrity. When the coils formed on the stator are energized, a magnetic flux is induced by the current through the coils, creating electromagnetic forces between the stator and the rotor. These electromagnetic forces contain tangential and/or circumferential forces that cause the rotor to rotate.

In order to achieve inherent fault-tolerance in these PM machines, there has to be complete electromagnetic, thermal, and physical isolation between the coils of the various phases. This is achieved by using fractional-slot concentrated windings where each coil is wound around a single stator tooth and each stator slot is occupied by one side of a coil. Since slots formed between the teeth and the permanent magnets on the rotor are spaced from each other, the magnetic flux passing through a tooth will pass through the neighboring tooth in the next moment as the rotor rotates.

The principles described herein are not limited to PM machines with fractional-slot concentrated windings. They can also be applied to any PM machine with any winding configuration to achieve the desired results.

Figure 9:
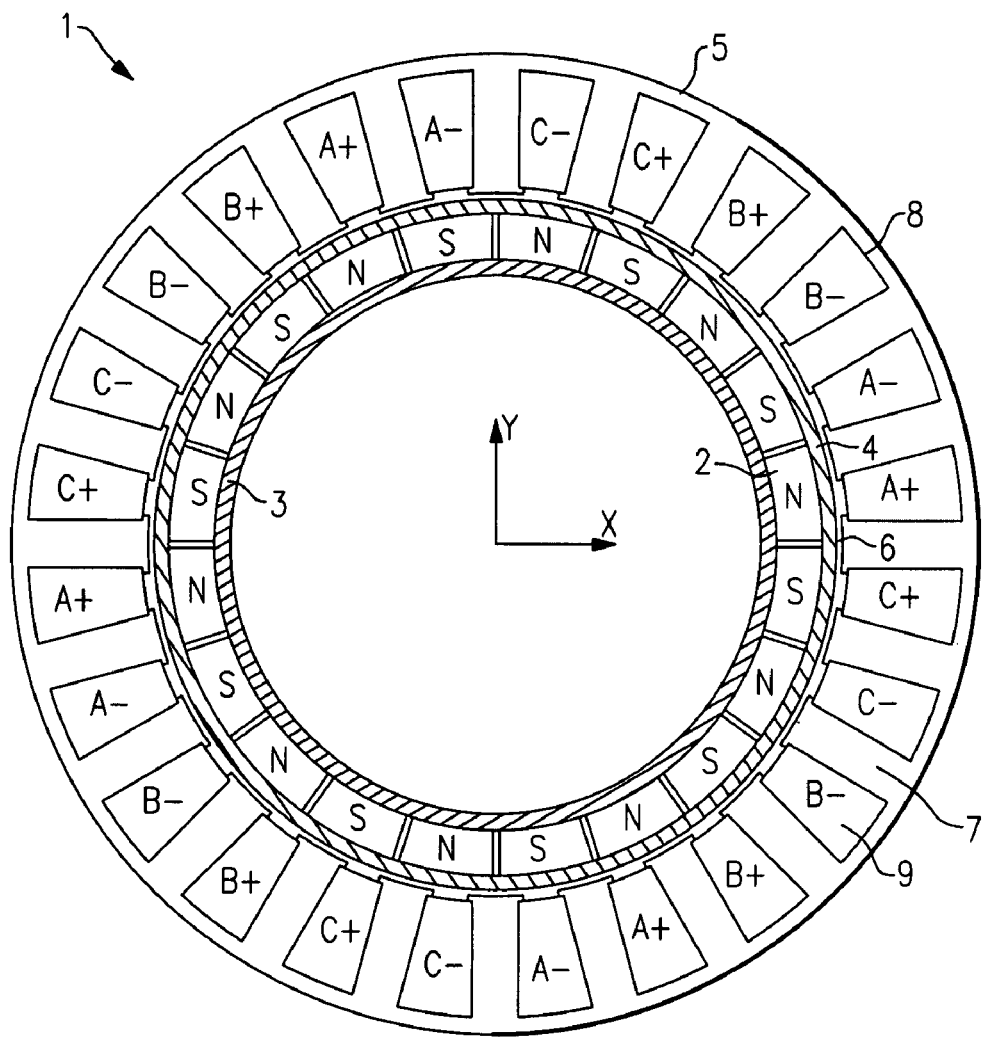
FIG. 9 illustrates a conventional permanent magnet machine architecture that is known in the prior art.

A conventional PM machine that is known in the art is shown in FIG. 9 to provide a background regarding PM machine architecture before describing several embodiments for implementing a synchronous permanent magnet machine that is fault-tolerant, and with particular focus on turn-to-turn faults, with reference to FIGS. 1-6 herein below.

As can be seen in FIG. 9, a PM machine 1 contains a plurality of magnets 2 provided in a radial arrangement upon a back iron 3 that is disposed around a shaft (not shown). The back iron 3 is also known as a yoke. The magnets 2 are surrounded by a retaining sleeve 4. A stator 5 surrounds the retaining sleeve 4 and is separated from the magnets 2 by a gap 6. The stator 5 has a plurality of radially disposed teeth 7 that form stator slots 8. The teeth 7 are wound with coils 9 that substantially fill the stator slots 8.

Figure 1:
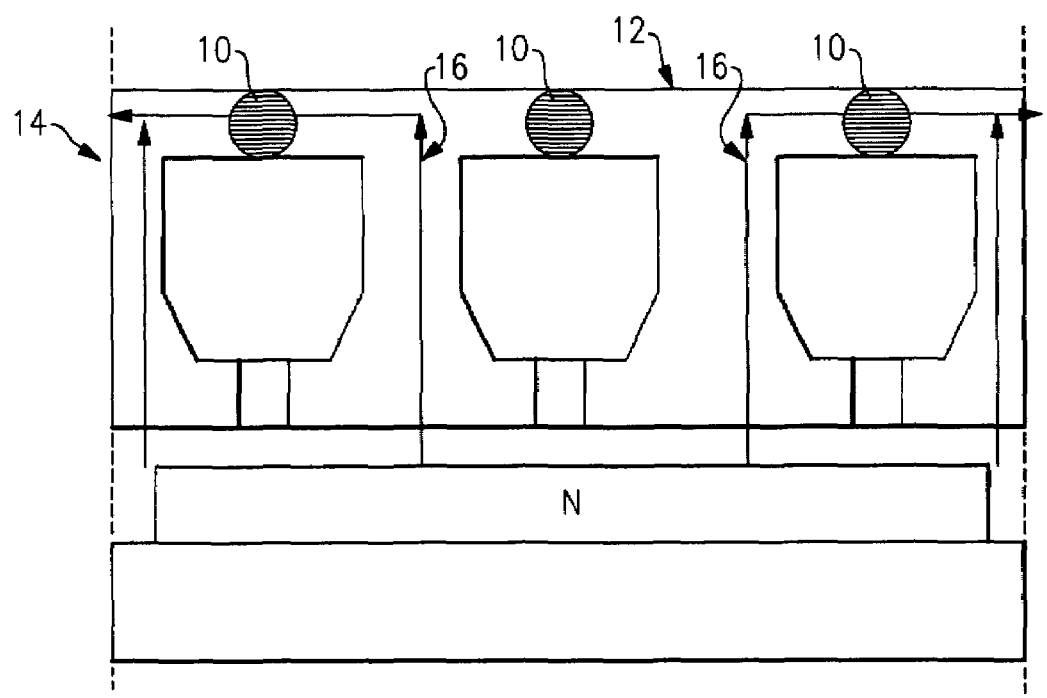
FIG. 1 illustrates a portion of a permanent magnet (PM) machine depicting rotatable laminated magnetic cylinders in the PM machine back iron (yoke) under normal operating conditions according to one embodiment of the present invention.
Figure 2:
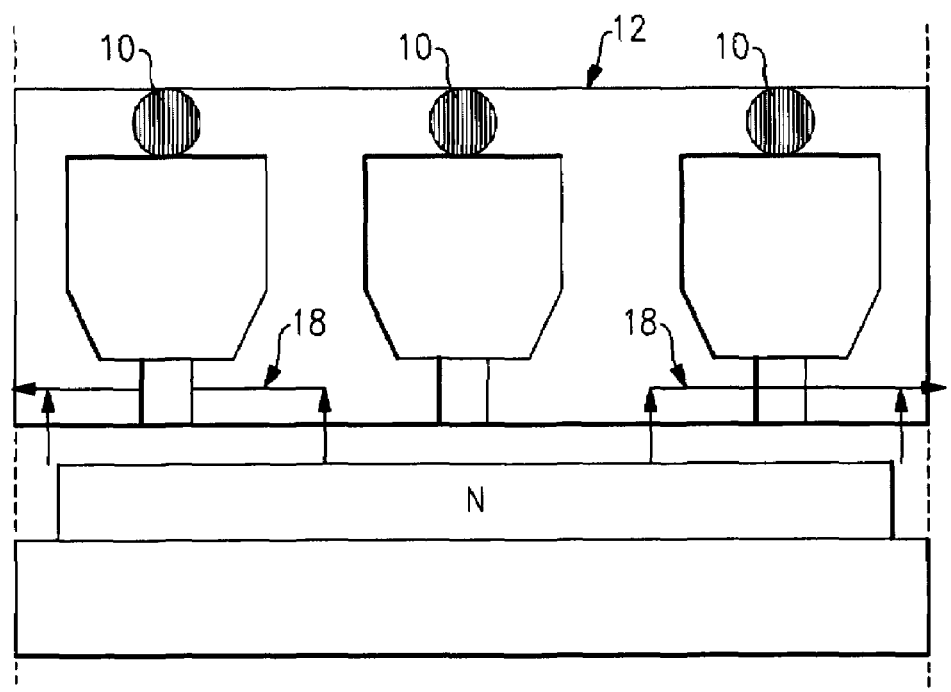
FIG. 2 illustrates a portion of a permanent magnet (PM) machine depicting rotatable laminated magnetic cylinders in the PM machine back iron (yoke) under a fault condition according to one embodiment of the present invention.

FIGS. 1 and 2 illustrate a portion of a permanent magnet machine depicting rotatable magnetically anisotropic cylinders 10 in the permanent magnet machine back iron (yoke portion) 12 of the stator core 14 according to one embodiment of the present invention. The magnetically anisotropic rotatable cylinders 10 can be constructed by, for example, but not limited to, forming the cylinders using a magnetically anisotropic material or using a plurality of magnetic laminations. These laminations can be any grade of silicon-steel laminations (e.g., M19, M23 . . . , etc.) or any grade of iron-cobalt laminations. The magnetic cylinders 10 can be seen in FIG. 1 to be seen to include a plurality of magnetic laminations oriented in a direction to provide a normal magnetic flux path 16 under normal operating conditions. Under fault conditions, all rotatable laminated magnetic cylinders 10 are rotated to simultaneously interrupt the normal magnetic flux path 16 in the stator back iron 12.

FIG. 2 depicts a new flux path 18 under a fault condition and shows the new flux path 18 does not pass through the stator back iron 12 of the permanent magnet machine. The rotatable laminated magnetic cylinders 10 are disengaged to block the normal flux path (orthogonal to the flux path) 16. In this manner, the rotatable laminated magnetic cylinders 10 in the stator back iron 12 are rotated 90° under fault conditions to impede and thus reduce the magnetic flux coupling with the stator windings and limit the fault current.

Figure 3A:
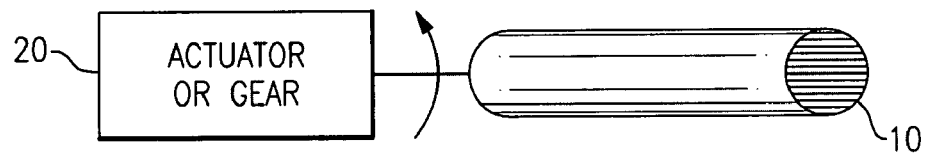
FIGS. 3a and 3b illustrate an actuator or gear assembly for rotating the rotatable cylinders shown in FIGS. 1 and 2.
Figure 3B:
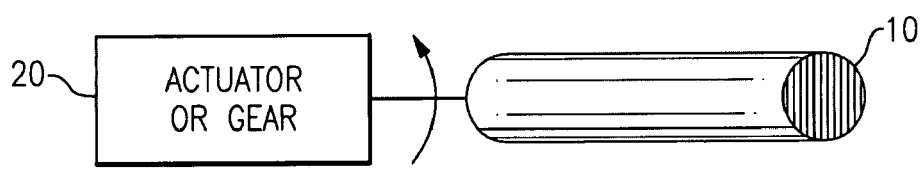

FIGS. 3a and 3b illustrate actuation of the rotatable laminated magnetic cylinders 10 depicted in FIGS. 1 and 2. Rotation of the rotatable laminated magnetic cylinders 10 is implemented via an actuator or gear assembly 20. The actuator or gear assembly 20 is affixed on permanent magnet machine end plates (not shown) in one embodiment. Many types of actuators and gear assemblies suitable for implementing this structure are easily constructed by those skilled in mechanical engineering; and so actuators and gear assemblies are not discussed in any detail herein to preserve brevity and provide clarity in describing the particular embodiments herein. Under normal operation, the rotatable laminated magnetic cylinders 10 are engaged to provide a normal flux path 16 such as depicted in FIG. 1. During a fault condition, the rotatable laminated magnetic cylinders 10 are disengaged by the actuator or gear assembly 20 as seen in FIG. 3b, to rotate the rotatable laminated magnetic cylinders 10 by approximately 90° to block the normal flux path 16, thereby shunting the magnetic flux away from the windings via a new flux path 18 as shown in FIG. 2, and reducing the fault currents.

Figure 4:
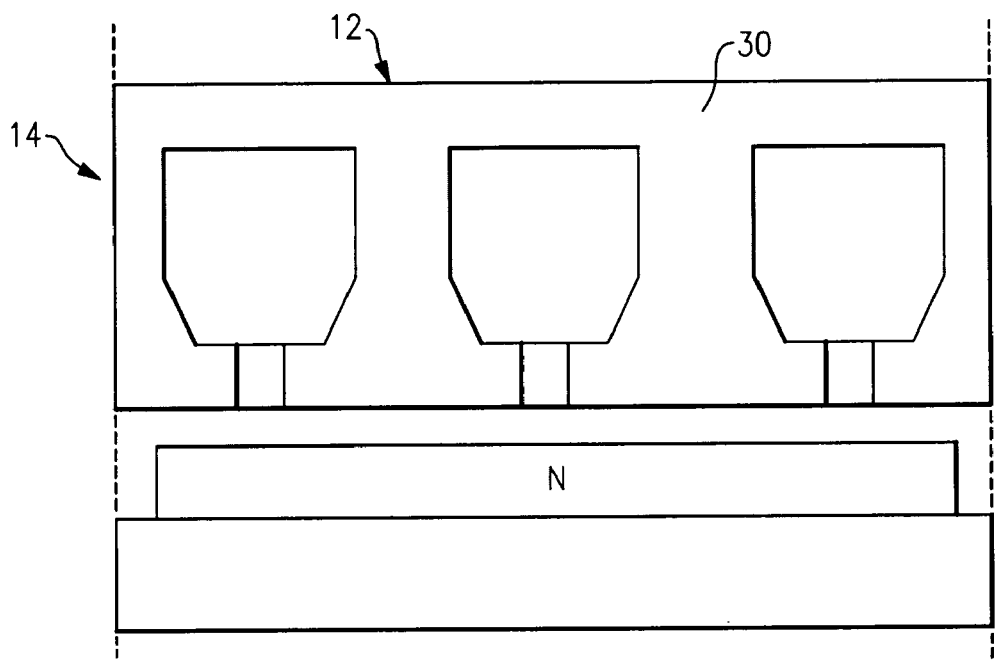
FIG. 4 illustrates a portion of a permanent magnet (PM) machine depicting a stator core that is selectively or fully made of a dual-phase magnetic material according to one embodiment of the present invention.

FIG. 4 illustrates a portion of a permanent magnet (PM) machine depicting a stator core 14 selectively or fully constructed of a dual-phase magnetic material 30. The present inventors found one suitable dual-phase magnetic material to consist of a Fe-17.5Cr-0.5C alloy (also known as YEP-FA1), available from Hitachi Metals, Ltd. This dual-phase magnetic material was found by the present inventors to possess magnetic properties superior to the ferrite materials generally known in the art. Use of known ferrite materials results, for example, in very large, bulky, PM machines to achieve the desired results because of the relatively poor magnetic properties of such ferrite materials. Further, the YEP-FA1 dual-phase magnetic material has transitive properties changing from magnetic to nonmagnetic beginning at a much higher temperature than the known ferrite materials that are generally bi-state in nature. The YEP-FA1 dual-phase magnetic material also exhibits a hysteresis-type effect in which it transitions to its original magnetic state upon cooling. Known ferrite materials generally do not return to their original magnetic state subsequent to cooling below their state-change temperature.

In one embodiment, only the back iron (yoke) 12 is constructed of the dual-phase magnetic material 30. In another embodiment, the entire stator core 14 is constructed of the dual-phase magnetic material 30. Under fault conditions, the high fault currents heat up the PM machine coils (not shown) causing stator core 14 heating. Beyond a certain temperature, the dual-phase magnetic material 30 becomes nonmagnetic, changing the normal flux path and resulting in a reduction of the stator flux and the fault current. It will be appreciated that any stator core 14 cooling could optionally be deactivated to increase the speed-up of stator core heating.

Figure 5:
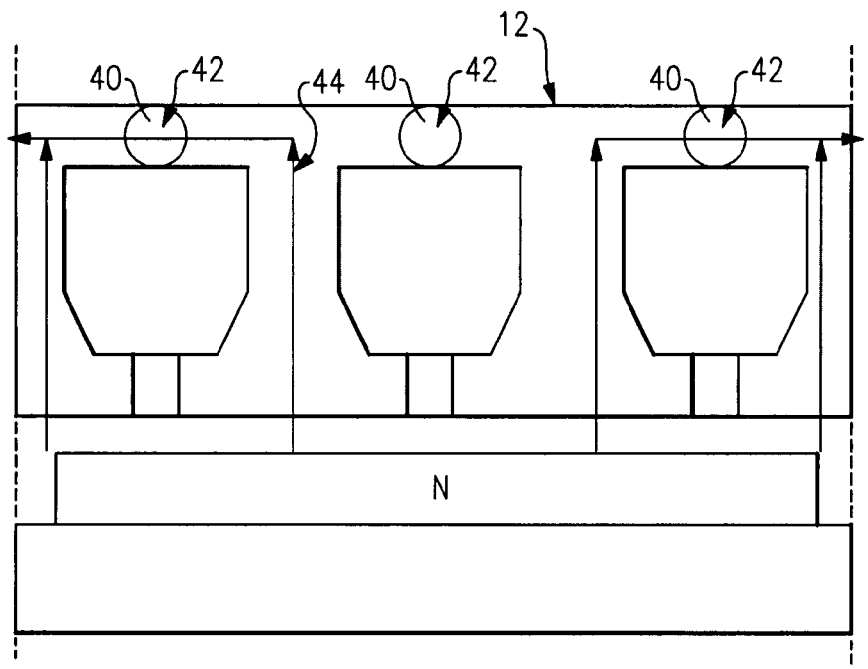
FIG. 5 illustrates a portion of a permanent magnet (PM) machine depicting cylindrical tubes in the PM machine back iron (yoke) filled with ferrofluid under normal operating conditions according to one embodiment of the present invention.
Figure 6:
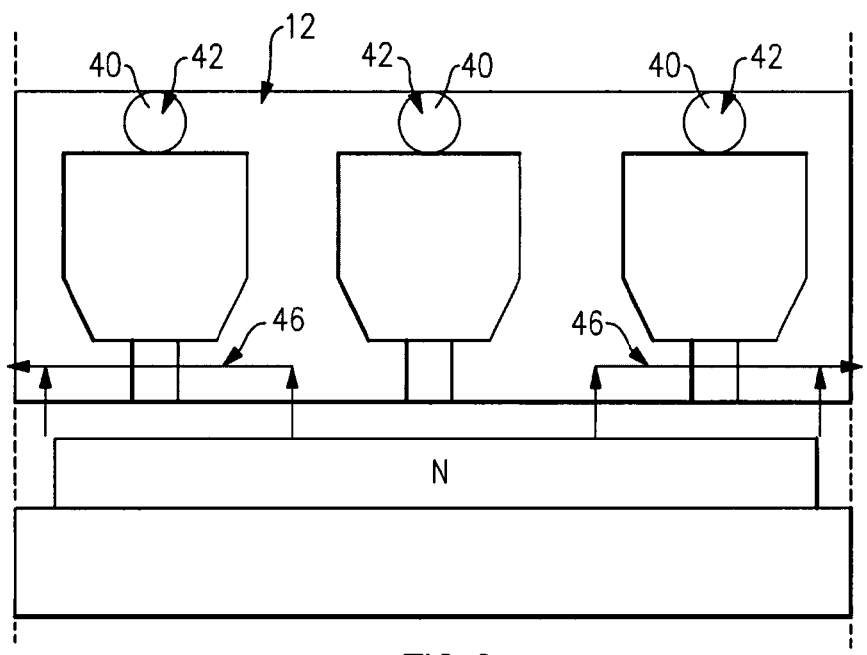
FIG. 6 illustrates the portion of a permanent magnet (PM) machine shown in FIG. 5 depicting the cylindrical tubes in the PM machine back iron (yoke) in which the cylindrical tubes are passively drained of the ferrofluid under fault conditions according to one embodiment of the present invention.

FIGS. 5 and 6 illustrate a portion of a permanent magnet (PM) machine depicting cylindrical chambers 40 in the stator core back iron 12 of the PM machine according to one embodiment of the present invention. Under normal operating conditions, the cylindrical chambers 40 are completely full with a magnetic ferrofluid 42 to create a magnetic flux path 44 as depicted in FIG. 5. Under fault conditions, the magnetic ferrofluid 42 is passively drained to empty the cylindrical chambers 40, greatly impeding the main flux path and diverting more flux through the high-reluctance flux path 46 that is further away from the permanent magnet machine windings (not shown), thus reducing winding fault currents, as seen in FIG. 6.

Figure 7:
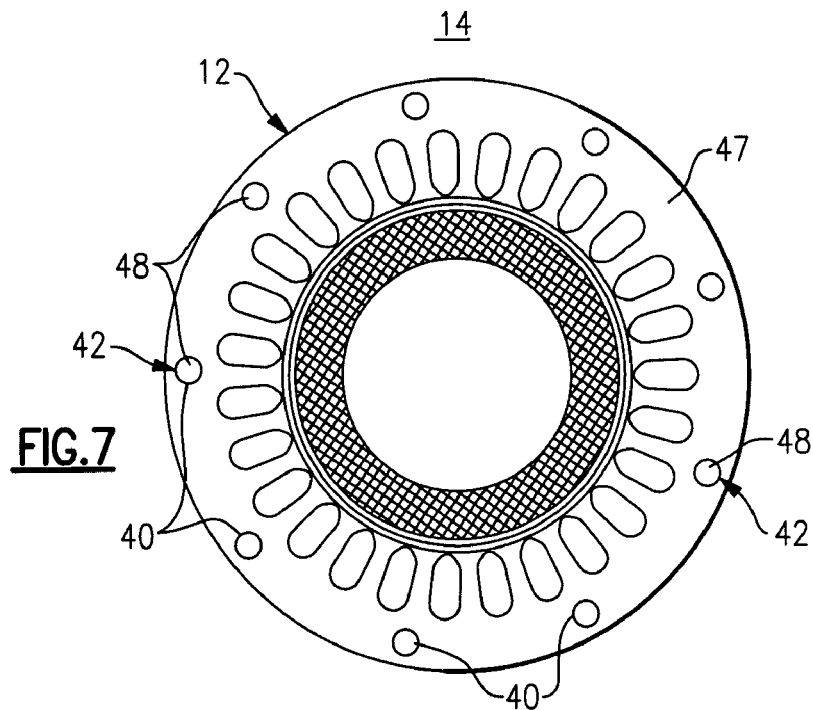
FIG. 7 illustrates in more detail, a back iron (yoke portion) of a permanent magnet (PM) machine depicting a set of axially-oriented chambers, each chamber having a static ferrofluid sealed therein, in which the chambers are passively drained of the ferrofluid under fault conditions according to one embodiment of the present invention.

FIG. 7 illustrates in more detail, a back iron (yoke portion) 12 of a permanent magnet (PM) machine stator core 14 depicting a set of axially-oriented chambers 40, each chamber having a static ferrofluid 42 sealed therein, in which the chambers 40 are passively drained of the ferrofluid 42 under fault conditions according to one embodiment of the present invention. The set of axially-oriented chambers 40 are provided within the stator laminations 47 of the back iron 12 portion of a permanent magnet machine (generator). These chambers 40 are normally completely sealed, and filled with a static ferrofluid 42. The ferrofluid 42 conducts the stator magnetic flux during normal machine operation. The ferrofluid chambers 40 are sealed by drain plugs 48 that are made of a material that will melt at an appropriate temperature. Suitable sealing materials are easily determined by one skilled in the thermal protection art, and so will not be discussed in further detail herein to preserve brevity and enhance clarity.

If a localized electrical fault occurs in the stator core 14 of the permanent magnet machine, excitation provided by the permanent magnet rotor can cause significant overload current to flow, as described herein before. Localized heating will occur in this case.

When the foregoing localized heating occurs, the heat generated at the internal stator core 14 fault will be conducted to the ferrofluid chambers 40 and the drain plugs 48. If the fault is severe enough, the plugs 48 will melt at that location and allow the ferrofluid to drain out of the stator laminations 47. When the ferrofluid 42 drains, the magnetic reluctance in the nearby stator flux paths will be increased, reducing the effectiveness of the rotor excitation in that area. This will ultimately reduce the local fault current to acceptable levels and prevent the condition from causing further damage to the stator core 14. The foregoing permanent magnet machine using passive thermal protection is advantageous in that it provides a more reliable, smaller, and cost competitive solution over similar protection mechanisms known in the art that require active actuation devices to pump ferrofluid out of the chambers 40 when a fault occurs.

Figure 8:
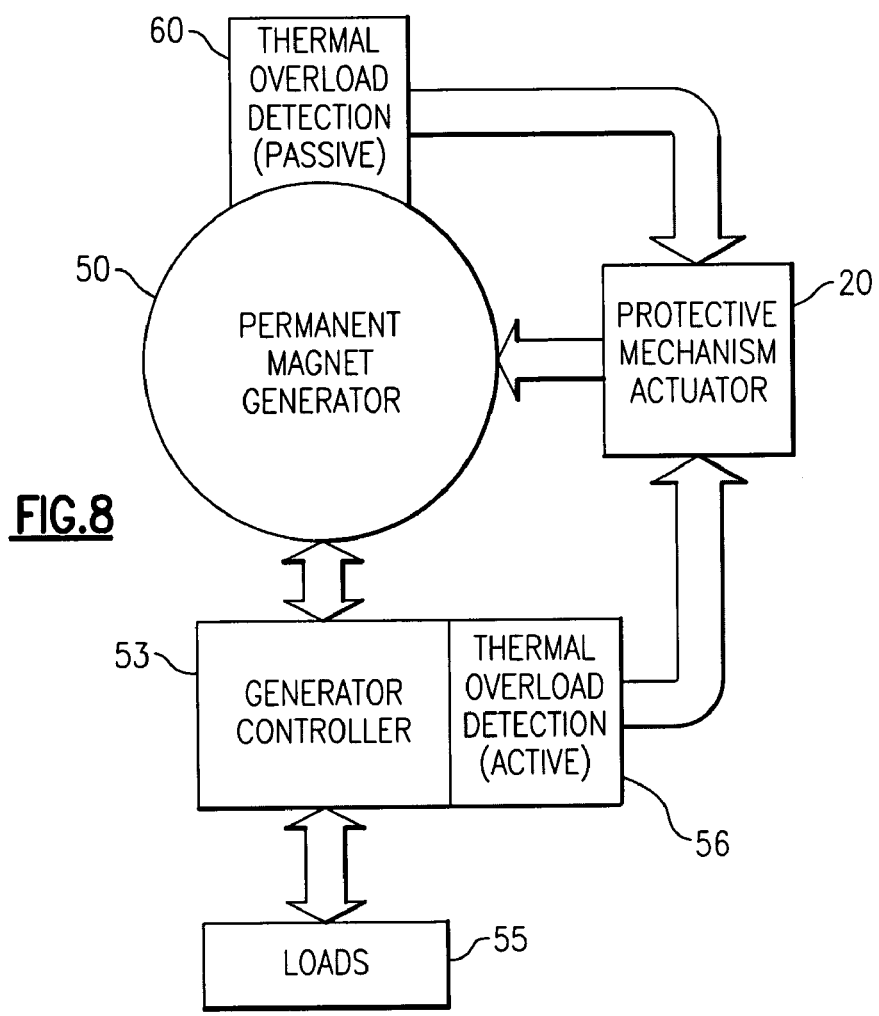
FIG. 8 is a block diagram illustrating a general provision for protection of a permanent magnet generator using active and/or passive detection of a thermal overload condition and triggering a protection mechanism actuator according to one embodiment of the present invention.

FIG. 8 is a block diagram illustrating a permanent magnet machine (i.e. generator) 50 using active and/or passive detection of a thermal overload condition, and triggering a protection mechanism actuator 20 according to one embodiment of the present invention. The permanent magnet machine 50 is controlled in response to commands from a generator controller 53 that senses one or more loads 55 supplied by the machine 50. The generator controller 53 is also in communication with an active thermal overload detection system 56 that operates to sense operating point conditions that are conducive to machine 50 overloading. Many types of active thermal overload detection methods and systems suitable for implementing the requisite active thermal overload detection system 56 are known in the art, and so further details of thermal overload detection systems will not be discussed herein.

When the active thermal overload detection system 56 detects an operating condition that exceeds one or more desired or predetermined operating condition set points, the active thermal overload detection system 56 sends one or more command signals to the protective mechanism actuator 20. The protective mechanism actuator 20 then operates in response to the command signal(s) to operate the rotatable laminated magnetic cylinders 10 shown in FIGS. 1 and 2 as described herein before. It will be appreciated that the protective mechanism actuator 20 can also be employed to open the drain plugs 48 described herein before with reference to FIG. 7, such that the ferrofluid 42 will be released from the chambers 40 containing the ferrofluid 42.

Further, the protective mechanism actuator 20 could just as easily be employed to shut down or deactivate a cooling mechanism or system to provide faster heating of a stator core 14 that is constructed of a dual-phase magnetic material such as discussed herein before with reference to FIG. 4. In this manner, fault currents are more quickly reduced to acceptable levels during a permanent magnet machine fault condition.

With continued reference now to FIG. 8, a passive thermal overload detection system (sensor) 60 is configured to directly sense thermal conditions of the permanent magnet machine (generator) 50. When the passive thermal overload detection system 60 detects an operating condition that exceeds one or more desired or predetermined operating condition set points, the passive thermal overload detection system 60 alters its physical state that is sensed by the protective mechanism actuator 20. The protective mechanism actuator 20 then operates in response to the physically altered state of the passive thermal overload detection system or device 60 to operate the rotatable laminated magnetic cylinders 10 shown in FIGS. 1 and 2 as described herein before, or in the alternative, to open the drain plugs 48 described herein before with reference to FIG. 7, such that the ferrofluid 42 will be released from the chambers 40 containing the ferrofluid 42. The passive thermal overload detection system 60 in one embodiment comprises one or more thermally sensitive drain plugs 48 that automatically rupture upon reaching a desired or predetermined temperature, such that the ferrofluid 42 will be released from the chambers 40 containing the ferrofluid 42, such as discussed herein before.

In summary explanation, methods for improving the fault-tolerance of PM machines have been described to include various electrical, mechanical, hydraulic or thermal solutions that provide flexibility in choosing the optimal PM machine architecture from a system point of view. These solutions include, but are not limited to 1) rotatable magnetically anisotropic cylinders 10 in the stator back iron 12 to interrupt the stator flux under fault conditions, 2) hollow chambers (tubes) 40 in the stator back iron 12 that each contains a magnetic ferrofluid that is drained under fault conditions in order to reduce stator fault currents, 3) a stator core 14 that is fully or selectively constructed from a dual-phase magnetic material, such that under fault conditions, the windings heat up the core 14 and the core 14 then becomes nonmagnetic, thus reducing the stator flux and the fault currents, 4) using an external heat source and/or shutting down the stator cooling in order to speed up the heating of the dual-phase magnetic material 30 under fault conditions, and 5) combining desired features described above as necessary to achieve desired system performance, reliability, cost, size, specifications/requirements, and so on.

A key feature of the embodiments described herein before include the provision of a fault tolerant permanent magnet machine that is more robust than permanent magnet machines known in the art that employ more conventional types of fault sensing mechanisms, actuators, controllers, and so on.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A permanent magnet (PM) machine comprising:
   a stator core portion;
   a rotor core portion; and
   a fault condition mechanism disposed within a back iron of the stator core portion, the mechanism operational to automatically reduce fault currents associated with the PM machine during a fault condition, wherein the fault condition mechanism comprises a plurality of independently rotatable cylinders comprising a magnetically anisotropic material or a plurality of magnetic laminations disposed within the back iron of the stator core portion.

2. The PM machine according to claim 1 further comprising an actuator or gear assembly configured to rotate the plurality of rotatable cylinders during a PM machine fault condition.

3. The PM machine according to claim 2, wherein the actuator or gear assembly is responsive to electrical signals generated via an active thermal overload detector.

4. The PM machine according to claim 2, wherein the actuator or gear assembly is responsive to a physically altered state associated with a passive thermal overload detector.

5. The PM machine according to claim 1, wherein the rotatable cylinders are oriented during normal PM machine operation to allow a flux path through the back iron of the stator core portion.

6. The PM machine according to claim 1, wherein the rotatable cylinders are oriented during a PM machine fault condition to impede a flux path through the back iron of the stator core portion and divert more flux through a high-reluctance flux path through stator core slot openings.

7. The PM machine according to claim 1 further comprising an actuator or gear assembly configured to actuate the fault condition mechanism during a PM machine fault condition.

8. The PM machine according to claim 7, wherein the actuator or gear assembly is responsive to electrical signals generated via an active thermal overload detector.

9. The PM machine according to claim 7, wherein the actuator or gear assembly is responsive to a physically altered state associated with a passive thermal overload detector.

10. A permanent magnet (PM) machine comprising:
    a stator core portion;
    a rotor core portion; and
    a fault condition mechanism disposed within a back iron of the stator core portion, the mechanism operational to automatically reduce fault currents associated with the PM machine during a fault condition, wherein the fault condition mechanism comprises a stator core back iron portion comprising a dual-phase magnetic material that changes its physical state during a PM machine fault condition to become substantially non-magnetic, and further that returns to its original pre-fault magnetic state upon cooling.

11. A permanent magnet (PM) machine comprising:
    a stator core portion;
    a rotor core portion; and
    a fault condition mechanism disposed within a back iron of the stator core portion, the mechanism operational to automatically reduce fault currents associated with the PM machine during a fault condition, wherein the fault condition mechanism comprises a plurality of cavities disposed within the back iron of the stator core portion, and further wherein each cavity contains a ferrofluid, wherein the ferrofluid in each cavity is sealed within the respective cavity via a respective thermally sensitive drain plug that ruptures during a PM machine fault condition to release the ferrofluid from its respective cavity.

12. A permanent magnet (PM) machine comprising a reconfigurable fault condition mechanism disposed within a stator back iron, the mechanism configured to automatically reduce internal heat associated with the PM machine during a fault condition, wherein the fault condition mechanism comprises at least one magnetically anisotropic independently rotatable cylinder.

13. The PM machine according to claim 12 further comprising an actuator or gear assembly configured to rotate the at least one rotatable cylinder during a PM machine fault condition.

14. The PM machine according to claim 12, wherein the at least one rotatable cylinder is oriented during normal PM machine operation to allow a flux path through the stator back iron.

15. The PM machine according to claim 12, wherein the at least one rotatable cylinder is oriented during a PM machine fault condition to impede a flux path through the stator back iron.

16. A permanent magnet(PM) machine comprising a reconfigurable fault condition mechanism disposed within a stator back iron, the mechanism configured to automatically reduce internal heat associated with the PM machine during a fault condition, wherein the fault condition mechanism comprises a back iron comprising a dual-phase magnetic material that changes its physical state during a PM machine fault condition to become substantially non-magnetic and impede a flux path through the back iron, and further that returns to its original pre-fault magnetic state upon cooling.

17. A permanent magnet (PM) machine comprising a fault condition mechanism configured to automatically reduce internal heat associated with the PM machine during a fault condition, wherein the fault condition mechanism comprises a stator core consisting entirely of a dual-phase magnetic material, wherein the dual-phase magnetic material changes its physical state during a PM machine fault condition to become substantially non-magnetic and impede a flux path through the stator core, and further that returns to its original pre-fault magnetic state upon cooling.

18. A permanent magnet (PM) machine comprising a reconfigurable fault condition mechanism disposed within a stator back iron, the mechanism configured to automatically reduce internal heat associated with the PM machine during a fault condition, wherein the fault condition mechanism comprises a plurality of ferrofluid-filled cavities, wherein the ferrofluid in each cavity is sealed within the respective cavity via a respective thermally sensitive drain plug that ruptures during a PM machine fault condition to release the ferrofluid from its respective cavity and impede a flux path through the back iron.

19. The PM machine according to claim 18 further comprising an actuator or gear assembly configured to empty the cavities during a PM machine fault condition to impede a flux path through the stator back iron.

20. A method of reconfiguring a permanent magnet (PM) machine upon detecting a fault condition, the method comprising the steps of:
  providing permanent magnet (PM) machine comprising a reconfigurable fault condition mechanism disposed within a stator back iron, the mechanism selected from a plurality of magnetically anisotropic independently rotatable cylinders, a plurality of ferrofluid-filled cavities, and a dual-phase material selectively embedded within a stator core; and
  reconfiguring the fault condition mechanism to automatically reduce fault currents or internal heat associated with the PM machine upon detection of a fault condition, wherein the step of reconfiguring the fault condition mechanism comprises rotating the plurality of independently rotatable cylinders, such that the plurality of independently rotatable cylinders impede a normal PM machine flux path through the stator back iron.

21. A method of reconfiguring a permanent magnet (PM) machine upon detecting a fault condition, the method comprising the steps of:
  providing permanent magnet (PM) machine comprising a reconfigurable fault condition mechanism disposed within a stator back iron, the mechanism selected from a plurality of magnetically anisotropic independently rotatable cylinders, a plurality of ferrofluid-filled cavities, and dual-phase material selectively embedded within a stator core; and
  reconfiguring the fault condition mechanism to automatically reduce fault currents or internal heat associated with the PM machine upon detection of a fault condition, wherein the step of reconfiguring the fault condition mechanism comprises draining the cavities, such that the drained cavities impede a normal PM machine flux path through the stator back iron.

22. A method of reconfiguring a permanent magnet (PM) machine upon detecting a fault condition, the method comprising the step of:
  providing permanent magnet (PM) machine comprising a reconfigurable fault condition mechanism disposed within a stator back iron the mechanism selected from a plurality of magnetically anisotropic independently rotatable cylinders, a plurality of ferrofluid-filled cavities, and a dual-phase material selectively embedded within a stator core; and
  reconfiguring the fault condition mechanism to automatically reduce fault currents or internal heat associated with the PM machine upon detection of a fault condition, wherein the step of reconfiguring the fault condition mechanism comprises heating the dual-phase material to change its state from a magnetic state to a non-magnetic state to impede a normal PM machine flux path through the stator back iron, and further comprises returning the dual-phase material to its original pre-fault magnetic state upon cooling subsequent to the fault condition.

* * * * *

UNITED STATES PATENT AND TRADEMARK OFFICE
CERTIFICATE OF CORRECTION

PATENT NO. : 7,541,705 B2 Page 1 of 1
APPLICATION NO. : 11/729512
DATED : June 2, 2009
INVENTOR(S) : Shah et al.

It is certified that error appears in the above-identified patent and that said Letters Patent is hereby corrected as shown below:

On the title page, item: (75) Inventors, Line 4:, delete "el-Rafaie" and insert -- EL-Refaie --, therefor.

In Column 10, Line 11, in Claim 21, after "and" insert -- a --.

Signed and Sealed this

Twenty-ninth Day of September, 2009

David J. Kappos
*Director of the United States Patent and Trademark Office*